US010660140B2

(12) United States Patent
Zhang et al.

(10) Patent No.: US 10,660,140 B2
(45) Date of Patent: May 19, 2020

(54) METHOD AND APPARATUS FOR CONTENTION-BASED UPLINK DATA TRANSMISSION

(71) Applicant: INTERDIGITAL PATENT HOLDINGS, INC., Wilmington, DE (US)

(72) Inventors: Guodong Zhang, Woodbury, NY (US); Afshin Haghighat, Ile-Bizard (CA); Erdem Bala, East Meadow, NY (US); David S. Bass, Great Neck, NY (US); Paul Marinier, Brossard (CA); Marian Rudolf, Montréal (CA); Stephen E. Terry, Northport, NY (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 0 days.

(21) Appl. No.: 16/173,700

(22) Filed: Oct. 29, 2018

(65) Prior Publication Data

US 2019/0069326 A1 Feb. 28, 2019

Related U.S. Application Data

(63) Continuation of application No. 15/681,628, filed on Aug. 21, 2017, now Pat. No. 10,117,275, which is a
(Continued)

(51) Int. Cl.
*H04W 74/08* (2009.01)
*H04W 74/00* (2009.01)
(Continued)

(52) U.S. Cl.
CPC ....... *H04W 74/0891* (2013.01); *H04W 52/50* (2013.01); *H04W 72/1268* (2013.01);
(Continued)

(58) Field of Classification Search
CPC ............. H04W 72/1268; H04W 72/14; H04W 72/042; H04W 74/0891; H04W 74/0833;
(Continued)

(56) References Cited

U.S. PATENT DOCUMENTS 6,519,461 B1   2/2003 Andersson et al.
7,817,613 B2 * 10/2010 Anderson ......... H04W 72/0413
                                                        370/335
(Continued)

FOREIGN PATENT DOCUMENTS

JP          11-266262        9/1999
JP       2005006337 A *      6/2004 ............ H04W 74/08
(Continued)

OTHER PUBLICATIONS

Ericsson, "LTE Advanced Latency Performance," 3GPP TSG-RAN WG2 #65bis, R2-092080 (Mar. 23-27, 2009).
(Continued)

*Primary Examiner* — Afsar M Qureshi
(74) *Attorney, Agent, or Firm* — Volpe and Koenig, P.C.

(57) ABSTRACT

A method and apparatus for a wireless transmit receive unit (WTRU) to use a contention-based uplink communications channel, applies a rule-based restriction of access to the contention-based uplink channel that attempts to use at least one contention-free uplink channel allocation for uplink transmissions on a condition that at least one contention-free uplink channel allocation has been granted.

20 Claims, 11 Drawing Sheets

Related U.S. Application Data continuation of application No. 15/056,688, filed on Feb. 29, 2016, now Pat. No. 9,743,433, which is a continuation of application No. 14/324,828, filed on Jul. 7, 2014, now Pat. No. 9,277,514, which is a continuation of application No. 12/854,495, filed on Aug. 11, 2010, now Pat. No. 8,774,819.

(60) Provisional application No. 61/233,736, filed on Aug. 13, 2009, provisional application No. 61/233,359, filed on Aug. 12, 2009.

(51) Int. Cl.

| | |
|---|---|
| H04W 76/25 | (2018.01) |
| H04W 52/50 | (2009.01) |
| H04W 72/12 | (2009.01) |
| H04W 72/14 | (2009.01) |
| H04W 52/10 | (2009.01) |
| H04W 52/14 | (2009.01) |
| H04W 72/04 | (2009.01) |

(52) U.S. Cl.
CPC ......... *H04W 72/14* (2013.01); *H04W 74/002* (2013.01); *H04W 76/25* (2018.02); *H04W 52/10* (2013.01); *H04W 52/146* (2013.01); *H04W 72/042* (2013.01); *H04W 74/0833* (2013.01)

(58) Field of Classification Search
CPC ..... H04W 76/25; H04W 52/50; H04W 52/10; H04W 52/146; H04L 5/0053
See application file for complete search history.

(56) References Cited

U.S. PATENT DOCUMENTS

| | | | |
|---|---|---|---|
| 8,102,804 | B2 | 1/2012 | Noh et al. |
| 8,125,921 | B2 | 2/2012 | Frenger et al. |
| 8,320,355 | B1 | 11/2012 | Ho |
| 8,509,168 | B2 | 8/2013 | Kim et al. |
| 8,804,580 | B2 * | 8/2014 | Anderson ......... H04W 72/0413 370/252 |
| 2005/0169296 | A1 | 8/2005 | Katar et al. |
| 2007/0064665 | A1 | 3/2007 | Zhang et al. |
| 2007/0189205 | A1 | 8/2007 | Terry et al. |
| 2007/0201397 | A1 | 8/2007 | Zhang |
| 2008/0095185 | A1 | 4/2008 | DiGirolamo et al. |
| 2008/0151928 | A1 | 6/2008 | Mosko et al. |
| 2008/0175265 | A1 | 7/2008 | Yonge et al. |
| 2008/0311919 | A1 | 12/2008 | Whinnett et al. |
| 2009/0097444 | A1 | 4/2009 | Lohr et al. |
| 2009/0143074 | A1 | 6/2009 | Pelletier et al. |
| 2009/0316593 | A1 | 12/2009 | Wang |
| 2010/0034162 | A1 * | 2/2010 | Ou ..................... H04L 1/1887 370/329 |
| 2010/0111029 | A1 * | 5/2010 | Chou .................. H04J 3/0682 370/329 |
| 2010/0322172 | A1 | 12/2010 | Hsu |
| 2011/0292895 | A1 * | 12/2011 | Wager ................ H04L 5/0007 370/329 |
| 2012/0044897 | A1 * | 2/2012 | Wager ................ H04L 5/0037 370/329 |
| 2012/0113938 | A1 * | 5/2012 | Larsson ............. H04W 74/008 370/329 |

FOREIGN PATENT DOCUMENTS

| | | |
|---|---|---|
| WO | 08/107856 | 9/2008 |
| WO | 08/156402 | 12/2008 |
| WO | 20090025525 A1 | 2/2009 |
| WO | 09/051549 | 4/2009 |
| WO | 09/087529 | 7/2009 |
| WO | 20090096745 A2 | 8/2009 |

OTHER PUBLICATIONS

Ericsson, St-Ericsson, "Contention Based Uplink Transmissions," 3GPP TSG-RAN WG2 #66bis, Los Angeles, U.S., R2-093812 (Jun. 29-Jul. 3, 2009).

Interdigital, "Bandwidth Aggregation Component Carrier Configuration Requirements," 3GPP TSG-RAN WG2 Meeting #66bis, R2-093740, Los Angeles, USA (Jun. 29-Jul. 3, 2009).

Interdigital, "Contention Based UL Transmission foe Dormant to Active State Transition," 3GPP TSG RAN WG2 Meeting #67, R2-094215 (Aug. 24-28, 2009).

Qualcomm Europe, "Support of Concurrent Transmission of PUCCH and PUSCH in LTE-A Uplink," 3GPP TSG RAN WG1 #55bis, R1-090362, Ljubljana, Slovenia (Jan. 12-16, 2009).

Qualcomm Inc., "UCI Transmission for CA," 3GPP TSG RAN WG1 #61, R1-102746, Montreal, Canada (May 10-14, 2010).

Samsung, "CQI report transmission using PUSCH resource [online]," 3GPP TSG-RAN WG1 Meeting #49b, R1-073118, Internet: URL:http://www.3gpp.org/ftp/tsg_ran/WG1_RL1/TSGR1_49b/Docs/R1-073118.zip, (Jun. 20, 2007).

Third Generation Partnership Project, "Technical Specification Group Radio Access Network; Evolved Universal Terrestrial Radio Access (E-UTRA); Medium Access Control (MAC) Protocol Specification (Release 8)," 3GPP TS 36.321 v8.6.0 (Jun. 2009).

Third Generation Partnership Project, "Technical Specification Group Radio Access Network; Evolved Universal Terrestrial Radio Access (E-UTRA); Medium Access Control (MAC) Protocol Specification (Release 8)," 3GPP TS 36.321 v8.9.0 (Jun. 2010).

Third Generation Partnership Project, "Technical Specification Group Radio Access Network; Evolved Universal Terrestrial Radio Access (E-UTRA); Medium Access Control (MAC) Protocol Specification (Release 9)," 3GPP TS 36.321 v9.3.0 (Jun. 2010).

Third Generation Partnership Project, "Technical Specification Group Radio Access Network; Evolved Universal Terrestrial Radio Access (E-UTRA); Multiplexing and Channel Coding (Release 8)," 3GPP TS 36.221 v8.7.0 (May 2009).

Third Generation Partnership Project, "Technical Specification Group Radio Access Network; Evolved Universal Terrestrial Radio Access (E-UTRA); Multiplexing and Channel Coding (Release 9)," 3GPP TS 36.212 v9.2.0 (Jun. 2010).

Third Generation Partnership Project, "Technical Specification Group Radio Access Network; Evolved Universal Terrestrial Radio Access (E-UTRA); Physical Layer Procedures (Release 8)," 3GPP TS 36.213 v8.7.0 (May. 2009).

Third Generation Partnership Project, "Technical Specification Group Radio Access Network; Evolved Universal Terrestrial Radio Access (E-UTRA); Physical Layer Procedures (Release 9)," 3GPP TS 36.213 v9.2.0 (Jun. 2010).

Third Generation Partnership Project, "Technical Specification Group Radio Access Network; Requirements for Further Advancements for Evolved Universal Terrestrial Radio Access (E-UTRA) (LTE-Advanced) (Release 8)," 3GPP TR 36.913 v8.0.1 (Mar. 2009).

Third Generation Partnership Project, "Technical Specification Group Radio Access Network; Requirements for Further Advancements for Evolved Universal Terrestrial Radio Access (E-UTRA) (LTE-Advanced) (Release 9)," 3GPP TR 36.913 v9.0.0 (Dec. 2009).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.9.0 (Jun. 2009).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.12.0 (Mar. 2010).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.0.0 (Jun. 2009).

(56) References Cited

OTHER PUBLICATIONS

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.4.0 (Jun. 2010).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.0.0 (Jun. 2010).

Third Generation Partnership Project, "Technical Specification Group Radio Access Network; Evolved Universal Terrestrial Radio Access (E-UTRA); Physical Channels and Modulation (Release 9)," 3GPP TS 36.211 V9.1.0 (Mar. 2010).

Third Generation Partnership Project, "Technical Specification Group Radio Access Network; Evolved Universal Terrestrial Radio Access (E-UTRA); Physical Channels and Modulation (Release 8)," 3GPP TS 36.211 V8.7.0 (Mar. 2009).

Third Generation Partnership Project, "Technical Specification Group Radio Access Network; Evolved Universal Terrestrial Radio Access (E-UTRA); Physical Channels and Modulation (Release 8)," 3GPP TS 36.211 V8.9.0 (Dec. 2009).

Third Generation Partnership Project, "Technical Specification Group Radio Access Network; Evolved Universal Terrestrial Radio Access (E-UTRA) Radio Resource Control (RRC); Protocol specification (Release 8)," 3GPP TS 36.331 V8.6.0 (Jun. 2009).

Third Generation Partnership Project, "Technical Specification Group Radio Access Network; Evolved Universal Terrestrial Radio Access (E-UTRA) Radio Resource Control (RRC); Protocol specification (Release 8)," 3GPP TS 36.331 V8.10.0 (Jun. 2010).

Third Generation Partnership Project, "Technical Specification Group Radio Access Network; Evolved Universal Terrestrial Radio Access (E-UTRA) Radio Resource Control (RRC); Protocol specification (Release 9)," 3GPP TS 36.331 V9.3.0 (Jun. 2010).

ZTE, "Uplink Control Channel Design for LTE-Advanced [online]," 3GPP TSG-RAN WG1 Meeting #56, R1-090629, Internet: URL:http://www.3gpp.org/ftp/tsg_ran/WG1_RL1/TSGR1_56/Docs/R1-020629.zip, (Feb. 3, 2009).

Panasonic, "Configuration for semi-persistent scheduling," 3GPP TSG RAN WG2 #61bis, R2-081575, Shenzhen, China (Mar. 31-Apr. 4, 2008).

\* cited by examiner

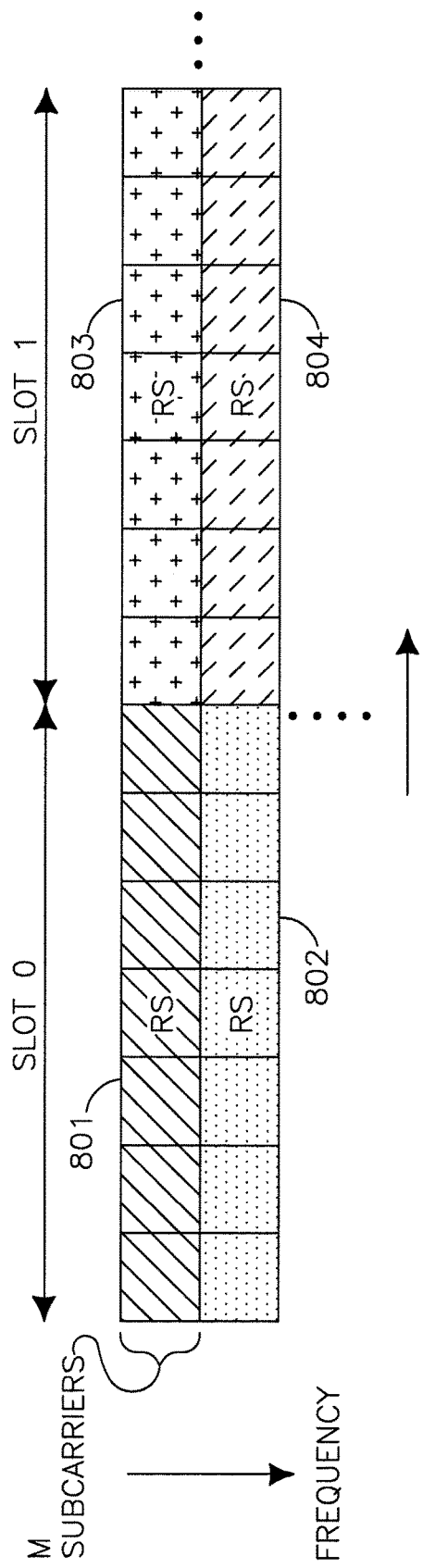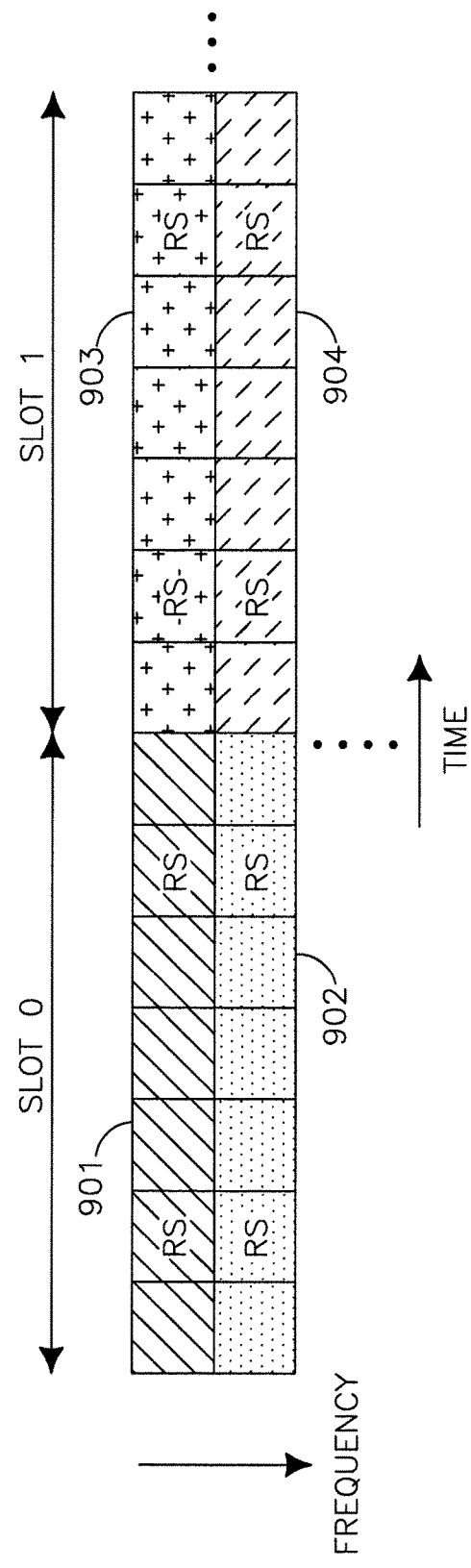

METHOD AND APPARATUS FOR CONTENTION-BASED UPLINK DATA TRANSMISSION

CROSS REFERENCE TO RELATED APPLICATIONS

This application is a continuation of U.S. patent application Ser. No. 15/681,628, filed Aug. 21, 2017, issuing as U.S. Pat. No. 10,117,275 on Oct. 30, 2018, which is a continuation of U.S. patent application Ser. No. 15/056,688, filed Feb. 29, 2016, which issued as U.S. Pat. No. 9,743,433 on Aug. 22, 2017, which is a continuation of U.S. patent application Ser. No. 14/324,828, filed Jul. 7, 2014, which issued as U.S. Pat. No. 9,277,514 on Mar. 1, 2016, which is a continuation of U.S. patent application Ser. No. 12/854,495, filed Aug. 11, 2010, which issued as U.S. Pat. No. 8,774,819 on Jul. 8, 2014, which claims the benefit of U.S. Provisional Application No. 61/233,736 filed on Aug. 13, 2009, and U.S. Provisional Application No. 61/233,359 filed on Aug. 12, 2009, the contents of all of which are hereby incorporated by reference herein.

FIELD OF INVENTION

This application is related to wireless communications.

BACKGROUND

A dormant wireless transmit receive unit (WTRU) is a WTRU that has a radio resource control (RRC) connection to the eNodeB, has established radio bearers, is known on cell level, but has activated discontinuous reception (DRX) for power saving during temporary inactivity. A WTRU can be quickly moved to this dormant "sub-state", and the latency for transition from dormant to active affects the quality of service (QoS). For a transition to active state, a dormant WTRU with uplink synchronization may request uplink data transmission via transmitting a Scheduling Request (SR) on the physical uplink control channel (PUCCH), in order to receive an access grant to the physical uplink shared channel (PUSCH). The following is an example of latency components for the transition to the active state based on current long term evolution (LTE) specifications for an error-free SR. Assuming a periodic PUCCH configured for SR is scheduled every 5 ms, the average waiting time is 2.5 ms. The transmission of an SR can be repeated until a scheduling grant is received. Assuming the first SR is successfully received by the eNodeB, the scheduling grant can be sent by the eNodeB after a 3 ms processing delay. If the grant is received in sub-frame n, the uplink (UL) data can be transmitted in sub-frame n+4, giving 3 ms for WTRU processing. With an uplink data transmission duration of 1 ms, the total transition delay can be 11.5 ms. The 3GPP LTE Advanced system aims for latency of the dormant to active transition of 10 ms, excluding the DRX cycle. The 10 ms transition includes initial message transmission, with a message size that fits one transmission time interval (TTI). Only error free transmission of data and signaling is assumed to fulfill the LTE-A target performance.

A contention-based (CB) uplink data transmission is sent only in uplink resource blocks (RBs) that have not been used for contention-free (CF) uplink transmission. A CB transmission allows uplink synchronized WTRUs to transmit uplink data without sending a scheduling request (SR) in advance, which reduces the latency and the signaling overhead. CB grants are received by the WTRU in a downlink and are used to assign unused resources on a per sub-frame basis. Thus, for small data packets, the packet may be more efficiently transmitted on a CB channel compared to a scheduled one. The CB transmission can also include a buffer status report (BSR), which provides the serving eNodeB with information about the amount of data available for transmission in the uplink buffers of the WTRU. A "regular BSR" is triggered when uplink data for a logical channel becomes available for transmission and either the data belongs to a logical channel with higher priority than the priorities of other logical channels and for which data is already available for transmission, or there is no data available for transmission for any of the logical channels. There are also other types of BSRs that are triggered by other trigger conditions.

SUMMARY

A method and apparatus for a wireless transmit receive unit (WTRU) to use a contention-based uplink communications channel, applies a rule-based restriction of access to the contention-based uplink channel that attempts to use at least one contention-free uplink channel allocation for uplink transmissions on a condition that at least one contention-free uplink channel allocation has been granted.

Another method and apparatus for a WTRU determines size of allocated contention-based uplink resources granted by a communication network and sets a length of a demodulation reference signal in frequency domain to match the size of the allocated CB uplink resource.

BRIEF DESCRIPTION OF THE DRAWINGS

A more detailed understanding may be had from the following description, given by way of example in conjunction with the accompanying drawings wherein:

FIGS. 8-10 show various examples of sub-channel and resource block assignments for a contention-based uplink channel.

DETAILED DESCRIPTION

Figure 1A:
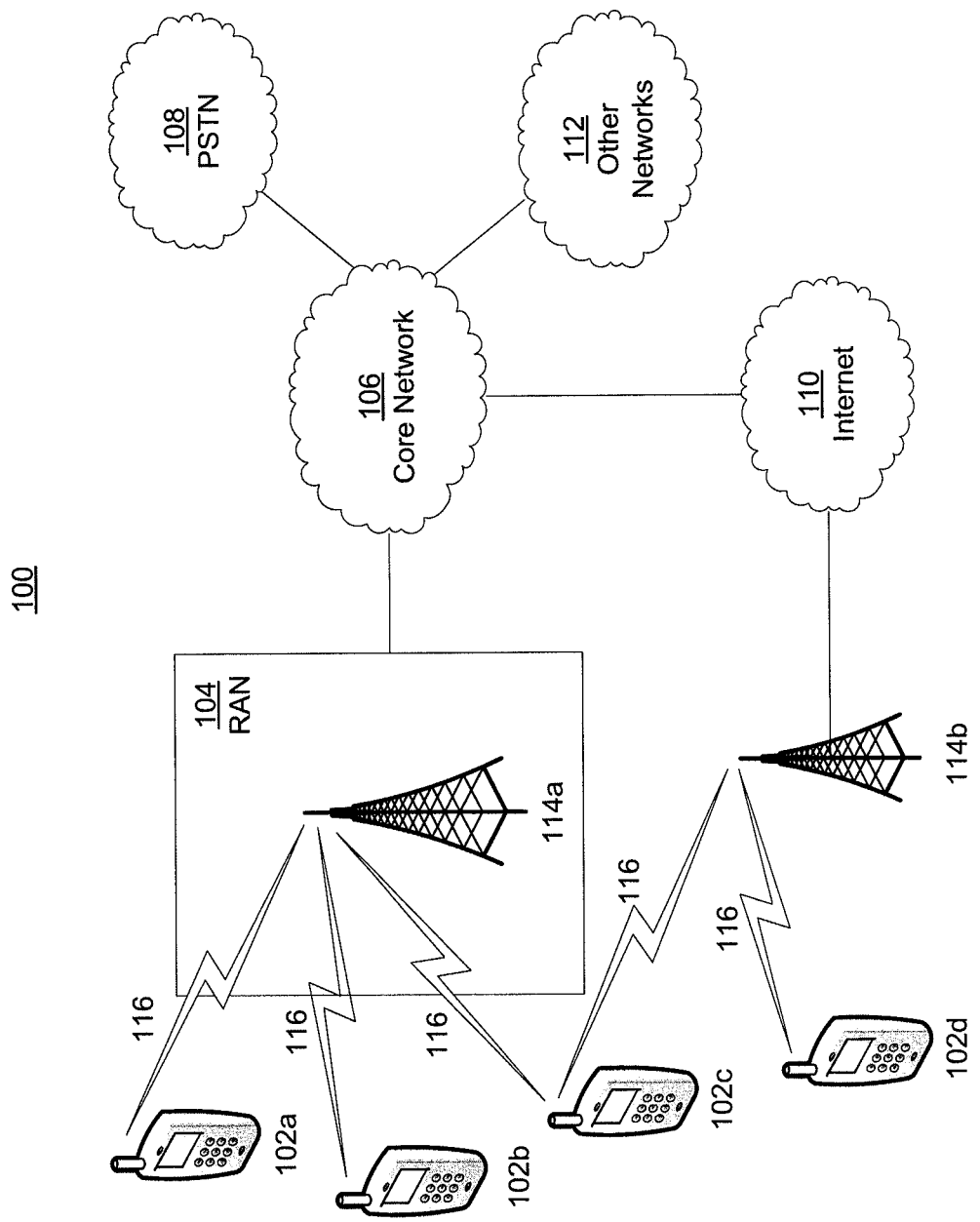
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
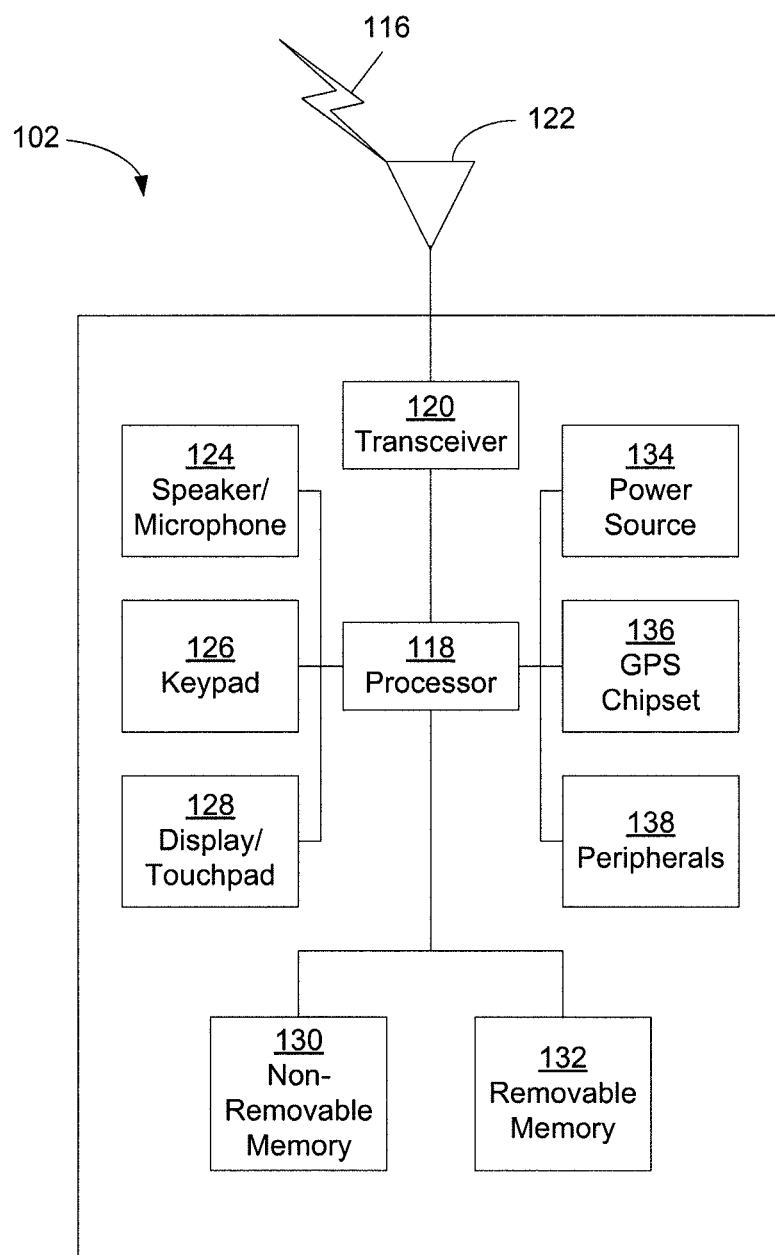
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
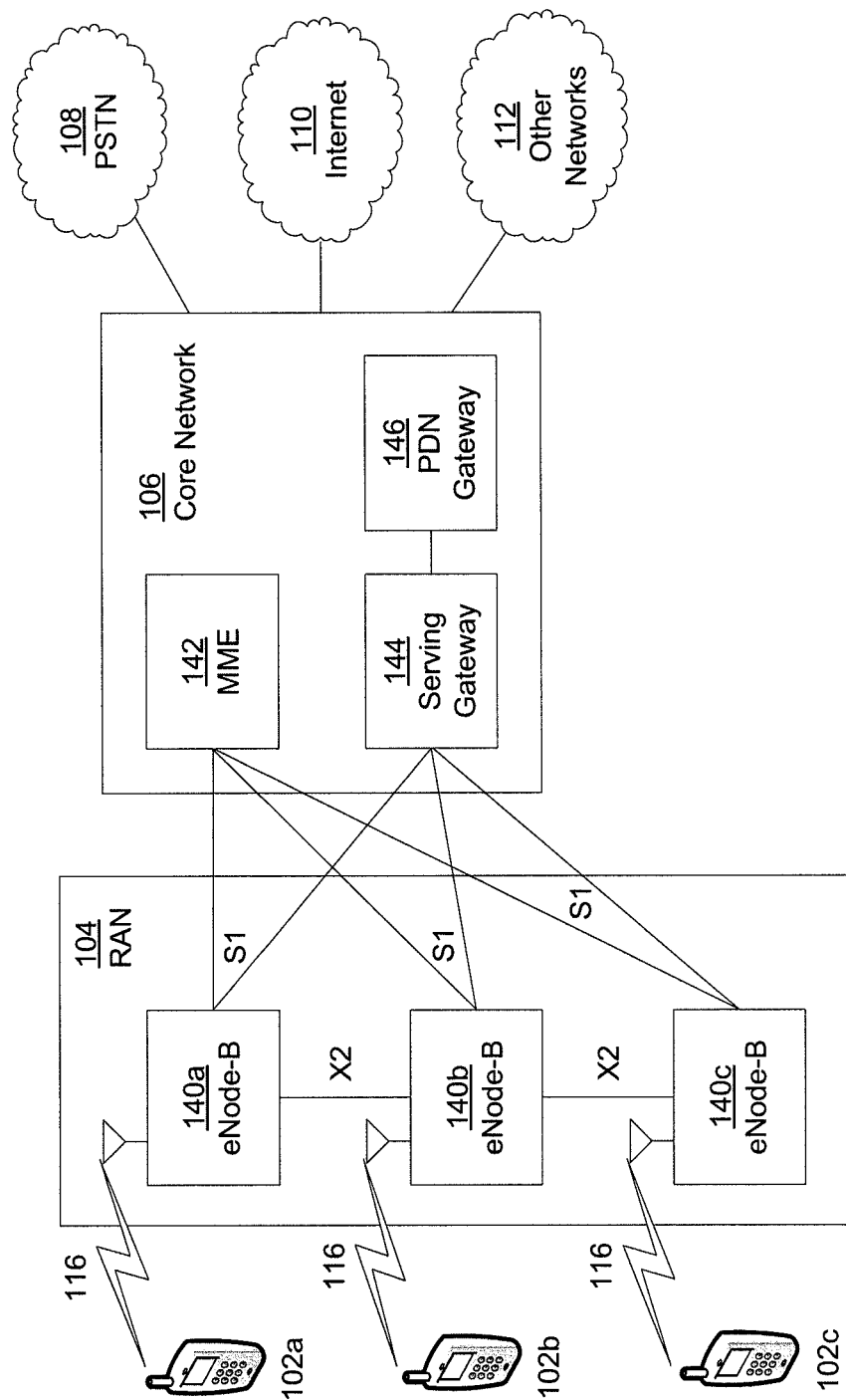
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116, where the WTRUs 102a, 102b, 102c are representative of the WTRU 102 depicted in FIG. 1B. The RAN 104 may also be in communication with the core network 106. The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

For a contention-based (CB) uplink (UL) transmission according to the methods disclosed herein, the WTRU 102a is synchronized for uplink and is in an RRC dormant sub-state with uplink data becoming available for transmission in the radio link control (RLC) entity or packet data control protocol (PDCP) entity, or has new uplink data with higher priority than existing data in the WTRU's transmit buffer. The WTRU 102a then has a decision whether to send an uplink transmission using a CB channel or a contention-free (CF) allocated channel (e.g., the physical uplink control channel (PUCCH)). A CB transmission may be sent on a CB physical uplink shared channel (CB-PUSCH). Since the CB-PUSCH may be used to supplement the contention-free PUCCH, the following rules are established for restricting access to the CB-PUSCH so that the CB-PUSCH is utilized efficiently, and the uplink transmissions of the WTRU 102a are distributed using both the CB-PUSCH and the PUCCH. The WTRU 102a processor 118 may be preconfigured to execute these rules and/or receive these rules in signaling from the eNodeB 140a.

Figure 2A:
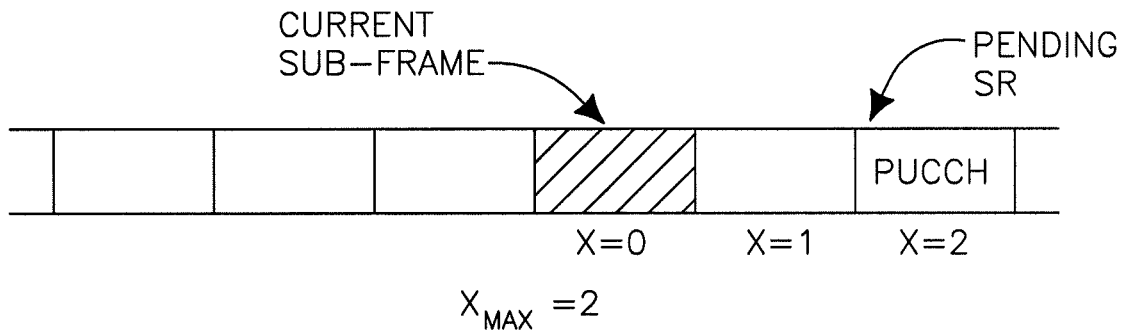
FIGS. 2A and 2B show a sub-frame timing diagram for scheduling request transmission used to restrict access on a contention-based uplink channel.

A first rule based restriction on using the CB-PUSCH is based on past and future SR occurrences. If the next PUCCH is scheduled or allocated for an SR within the current sub-frame or next few sub-frames (e.g., future SR occurrences scheduled to occur within X sub-frames, X=0, 1. . . Xmax), the WTRU 102a may be restricted from using the CB-PUSCH. Instead, the WTRU 102a may use the PUCCH in the allocated sub-frame to transmit the SR rather than access the CB-PUSCH, which leaves the CB-PUSCH available for the other WTRUs 102b, 102c. For example, as shown in FIG. 2A, the WTRU 102a has a PUCCH scheduled at sub-frame X=2, where X=Xmax=2, and therefore, the WTRU 102a will wait for the PUCCH to transmit the SR, rather than transmit on a CB-PUCSH. The value of Xmax depends on the overall latency for the SR processing, including the waiting for the next PUCCH configured for SR, sending the SR, and/or getting the uplink grant.

Figure 2B:
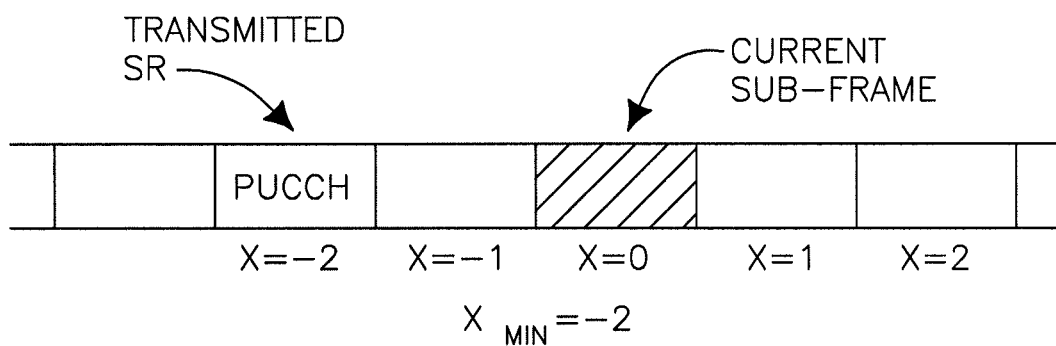

Alternatively, if the WTRU 102a has already transmitted an SR on the PUCCH in the past few sub-frames, (e.g., within X sub-frames, X≥Xmin), and the related subsequent PUSCH grant has not yet been received, the WTRU 102a is restricted from using the CB-PUSCH for the SR, with the expectation that the PUSCH grant is imminent. See for example, FIG. 2B, where the WTRU 102a transmitted on the PUCCH at sub-frame X≥Xmin=−2. Thus, the CB-PUSCH is conserved for reliance on the SR being granted conventionally. The value of Xmin depends on the latency of the eNodeB 140a in scheduling the uplink for the WTRU 102a.

Alternatively, the WTRU 102a may employ parallel usage of CB-PUSCH and SR submission on PUCCH until either process results in granting of uplink shared channel resources. Upon granting of either request, eNodeB 140a may ignore any other uplink access request in progress.

Figure 3:
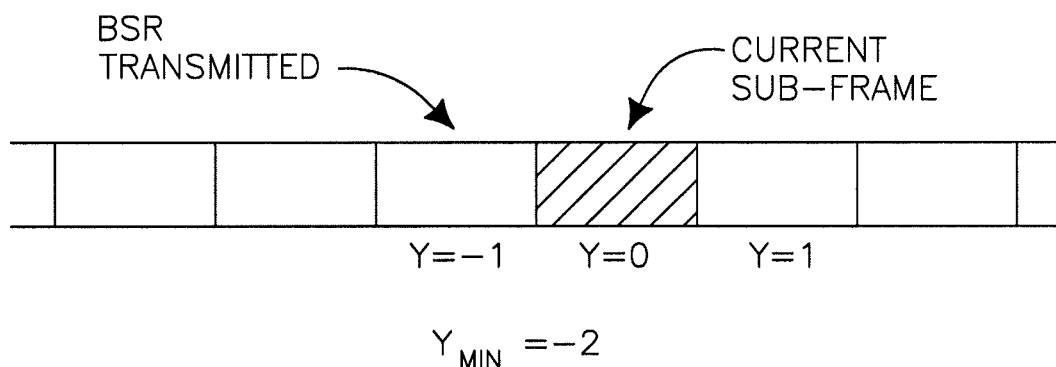
FIG. 3 shows a sub-frame timing diagram for buffer status report used to restrict access on a contention-based uplink channel.

A second restriction rule for the CB-PUSCH is based on past and future buffer status report (BSR) occurrences. When a BSR is triggered, to send, if at least one BSR has been transmitted (and positively acknowledged), and the data reported in this BSR has not been successfully transmitted, the WTRU 102a is restricted from accessing the CB-PUSCH at least until this data is transmitted by a contention-free PUSCH transmission. Alternatively, if at least one BSR has been transmitted (and positively acknowledged) in the past few sub-frames (e.g., for at sub-frame Y, where Y≥Ymin), the WTRU is restricted from using the CB-PUSCH in the current sub-frame (or transmission time interval (TTI)). FIG. 3 shows an example where the BSR is transmitted at sub-frame Y≥Ymin=−1, thus the WTRU 102*a* is prohibited access to the CB-PUSCH. The value of Ymin depends on latency of the eNodeB 140*a* in scheduling the uplink for the WTRU 102*a*.

With respect to the CB-PUSCH interaction with a BSR and an SR, when a BSR is triggered by the WTRU 102*a*, and there are no contention-free uplink resources in the present TTI to send the BSR together with data, an SR may be triggered by the WTRU 102*a*. If the WTRU 102*a* transmits data with a BSR on the CB-PUSCH, the BSR triggering condition is maintained and/or an SR remains pending until contention-free UL-SCH resources are granted for the WTRU. This provides a contingency for a transmission collision on the CB-PUSCH where the BSR may not be received successfully by the eNodeB 140*a*. Therefore, an SR may be transmitted on the PUCCH in subsequent sub-frames after CB-PUSCH transmission, or a BSR is retransmitted on the next CB-PUSCH access opportunity, with consideration to the above ruled based restrictions, until a contention-free UL-SCH resource is granted.

The following methods may be implemented by the WTRU 102*a* with respect to the CB-PUSCH interaction with a BSR. Buffer status reporting is controlled by a radio resource control (RRC) entity of the WTRU 102*a*, by configuring BSR timers. A timer retxBSR-Timer is used to trigger a Regular BSR, and a timer periodicBSR-Timer is used to trigger a Periodic BSR upon timer expiration. If the WTRU 102*a* transmits data with a BSR on the CB-PUSCH, all triggered BSRs may be cancelled and the WTRU 102*a* should start or restart the timer periodicBSR-Timer (except when the BSR is a truncated BSR), and start or restart the Regular BSR timer retxBSR-Timer. In this way, a BSR may not be transmitted on the CB-PUSCH in subsequent sub-frames until either the timer periodicBSR-Timer or the timer retxBSR-Timer expires.

Alternatively, if the WTRU 102*a* transmits data with BSR on the CB-PUSCH, the regular BSR triggering condition may not be cancelled until the contention-free UL-SCH resources are granted for the WTRU. In this way, the BSR can be retransmitted on the CB-PUSCH in subsequent sub-frames whenever there are valid contention-based uplink grants.

In another alternative, if the WTRU 102*a* transmits data with BSR on the CB-PUSCH, all triggered BSRs may be cancelled, and the WTRU should start or restart a new CB timer retx-CB-BSR-Timer in addition to setting of the timer periodicBSR-Timer and the timer retxBSR-Timer as set forth above. The value of the timer retx-CB-BSR-Timer should be no less than one and no greater than the value of timers retxBSR-Timer and/or periodicBSR-Timer. For example, to ensure that the value of the timer retx-CB-BSR-Timer remains no greater that the value of timer retxBSR-Timer, the timer retx-CB-BSR-Timer may be reset in response to a reset of the timer retxBSR-Timer. In this way, the BSR will not be transmitted on CB-PUSCH in subsequent sub-frames until the timer retx-CB-BSR-Timer expires.

Figure 4A:
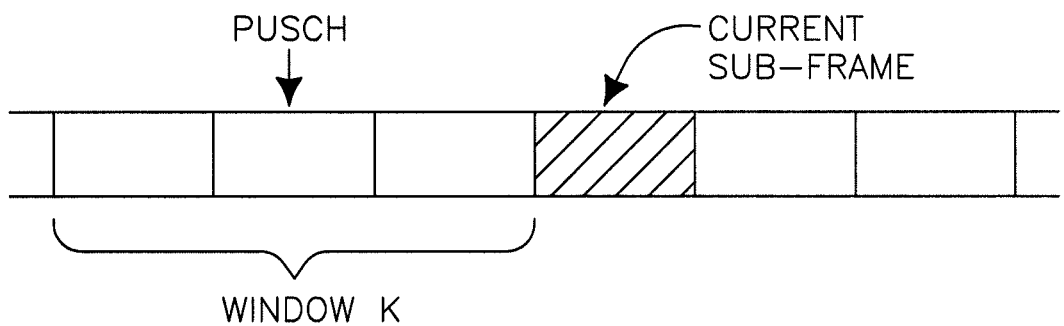
FIGS. 4A and 4B show a sub-frame timing diagram for uplink channel transmission used to restrict access on a contention-based uplink channel.
Figure 4B:
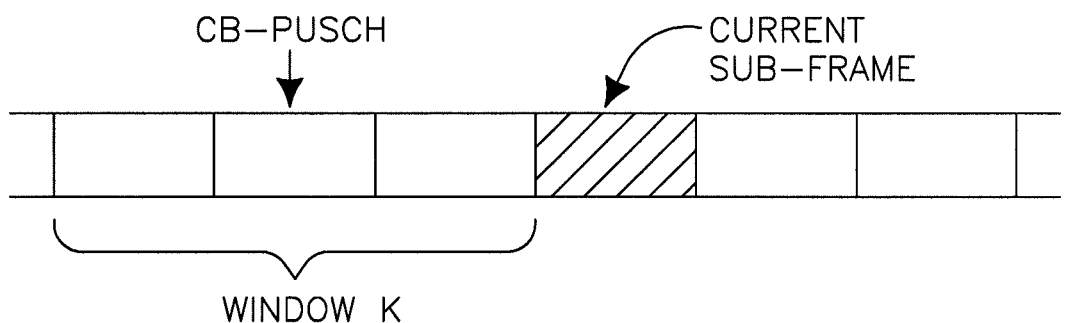

The restriction on using the CB-PUSCH for the WTRU 102*a* may also be window based with respect to recent transmissions on the PUSCH and the CB-PUSCH as follows. If the WTRU 102*a* has transmitted data on at least one PUSCH in the past few K sub-frames (i.e., the window size is K sub-frames, where K is a positive integer), then the WTRU 102*a* is restricted from accessing the CB-PUSCH in the current sub-frame (TTI). FIG. 4A shows an example of the WTRU 102*a* having transmitted on the contention-free PUSCH within the window of K sub-frames, and therefore, the WTRU 102*a* is prohibited access to the CB-PUSCH. Alternatively, if at least one CB-PUSCH transmission by the WTRU 102*a* has occurred in the past K sub-frames, then the WTRU 102*a* is restricted from accessing the CB-PUSCH in the current sub-frame (or TTI). FIG. 4B shows an example of the WTRU 102*a* having transmitted on the CB-PUSCH within K sub-frames, such that access to the CB-PUSCH is prohibited.

The WTRU 102*a* may also monitor the type of uplink load for determining whether to use CB-PUSCH. For example, the WTRU 102*a* may gather statistics of uplink contention-based resources usage as received on a downlink system information block (SIB) or a new common control element (CCE). As another example, the WTRU 102*a* may monitor statistics on uplink contention-free resource usage. The WTRU may derive this information by monitoring the PDCCH with a cyclic redundancy check (CRC) scrambled by contention-based radio network temporary identifiers (CB-RNTIs) (i.e., a number of used contention-free resource blocks (RBs) is equal to the total number of RBs, excluding RBs used for PUCCH, minus the number of contention-based RBs). Based on the monitored uplink load types of the WTRU 102*a* and/or the other WTRUs 102*b*, 102*c* using uplink resources of the same serving cell/RAN 104, the WTRU 102*a* may determine a probability for the WTRU 102*a* to access the CB-PUSCH and then decide to use the CB-PUSCH based on the probability of access. Table 1 summarizes the above described rules for restriction of CB-PUSCH transmissions.

TABLE 1

| CB-PUSCH Access Restriction Rules | |
|---|---|
| SR | CB-PUSCH access prohibited if SR scheduled for PUCCH in sub-frame X, where 0 ≤ X ≤ Xmax; or if SR recently transmitted in PUCCH in previous sub-frame X, where Xmin ≤ X < 0. |
| SR/UL-SCH Grant | WTRU sends both a CB-PUSCH transmission and an SR on PUCCH. eNodeB grants one of the requests, and ignores any other pending requests. |
| BSR | CB-PUSCH access prohibited if BSR transmitted but related data reported is not yet transmitted; or if at least one BSR recently transmitted in previous sub-frame Y, where Ymin ≤ Y < 0. |
| PUSCH/CB-PUSCH | CB-PUSCH access prohibited if data transmitted recently on PUSCH or CB-PUSCH within past K sub-frames. |
| UL Load | WTRU determines amount of contention-free resources used and/or contention-based resources being used in the uplink, and assesses whether to access CB-PUSCH. |

In another embodiment, the RB location and the number of RBs used for CB-PUSCH are controlled to reduce the blind decoding complexity at the eNodeB 140*a*. The WTRU 102*a* may be granted contention-based uplink resources via the PDCCH, where the grant is in terms of a number of RBs allocated for the uplink transmission. A fixed number of RBs may be used by the WTRU 102*a* for CB-PUSCH transmissions. For example, the fixed number can be 1 RB, or 1 RB group (RBG), or multiple RBs. Alternatively, a set of fixed number of RBs may be used. For example, a set of fixed number of RBs can be {1 RB, 2 RBs}. In this example, the WTRU 102*a* may choose to use one of the fixed numbers (1RB or 2RBs) based on: (a) the amount and/or priority of its uplink data; (b) the WTRU class for WTRU 102*a*; and/or (c) the radio link condition for the WTRU 102*a* (such as path loss) in the uplink. Another possible way to control the number of RBs is by respectively assigning a CB-RNTI to each unique number of RBs. Thus, the WTRU 102a may be restricted to a fixed number of RBs for CB-PUSCH by being configured with a subset of CB-RNTIs associated with the desired set of fixed number of RBs. Available CB-PUSCH resources may be partitioned by CB-RNTIs, such that each WTRU 102 a, 102b, 102c may be configured for access associated with one or more CB-RNTIs. Some of the WTRUs 102a, 102b, 102c may therefore have more access opportunities on the CB-PUSCH than others. The WTRU 102a may receive CB-RNTI grants on the PDCCH where each grant may offer a different number of RBs. Therefore, the WTRU 102a may receive a larger or a smaller grant than the other WTRUs 102b, 102c. The WTRU 102a may access specific CB-RNTIs configured with dedicated signaling, or may be based on WTRU access service classes.

In yet another alternative method, the eNodeB 140a dynamically sets the number of allocated RBs for CB-PUSCH operation according to the uplink traffic load. In times of light uplink activities, more RBs may be assigned for CB-PUSCH. To avoid increasing the PDCCH signaling overhead due to dynamic assignment of CB-PUSCH RBs, the eNodeB 140a may define fixed locations for RBs through RRC signaling. Dynamic assignment of RBs is not necessary due to the fact that different WTRUs have different frequency of selectivity over multiple RBs (i.e., an RB that is favorable for one WTRU may be unfavorable for another). WTRU.

Figure 5A:
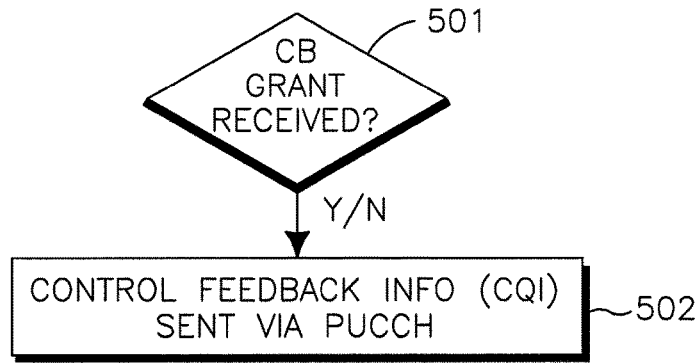
FIGS. 5A and 5B show method flow charts for simultaneous transmission on a contention-based uplink and a contention-free uplink.
Figure 5B:
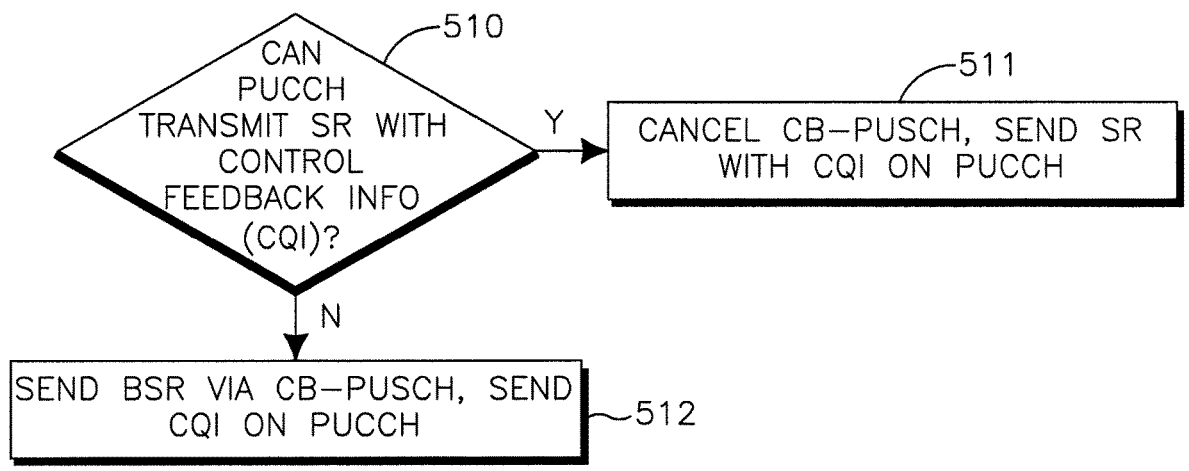

In another embodiment, rule-based methods control simultaneous transmission of the CB-PUSCH and other uplink channels. The LTE specifications require that uplink control feedback information, such as channel quality index (CQI), precoding matrix index (PMI), rank index (RI) and acknowledge/negative acknowledge (ACK/NACK) signals, be transmitted on the PUSCH scheduled by a cell RNTI (C-RNTI) or a semi-persistent scheduling C-RNTI (SPS-C-RNTI) when a PUSCH is present. For aperiodic reporting of control information, the PUSCH is used, while periodic reporting of control feedback information occurs on the PUCCH. In this embodiment, the decision regarding whether uplink control feedback information should be transmitted on the CB-PUSCH may be rule-based. FIG. 5A shows a first variation of this rule-based method, in which uplink control information is divided between the PUCCH and the CB-PUSCH. In this variation, the control feedback information for the WTRU 102a, such as CQI, PMI, RI, and ACK/NACK, is always transmitted on the PUCCH (502), regardless of whether the WTRU 102a receives a contention-based uplink grant (501) successfully, while other control information, such as a BSR, may be transmitted on the CB-PUSCH when granted. FIG. 5B shows a second variation, in which the WTRU 102a may transmit on the CB-PUSCH depending on the type of concurrent PUCCH. For example, if uplink control information is transmitted on a type of PUCCH that can transmit an SR (510), then the WTRU 102a may cancel its CB-PUSCH transmission (511), and transmit the SR on the PUCCH. This type of PUCCH includes all PUCCH types defined in LTE Re18. However, if the type of PUCCH defined for uplink control feedback information transmission does not allow for an SR to be transmitted by the WTRU 102a, then the WTRU 102a may transmit its BSR on a CB-PUSCH upon grant (512).

Figure 6A:
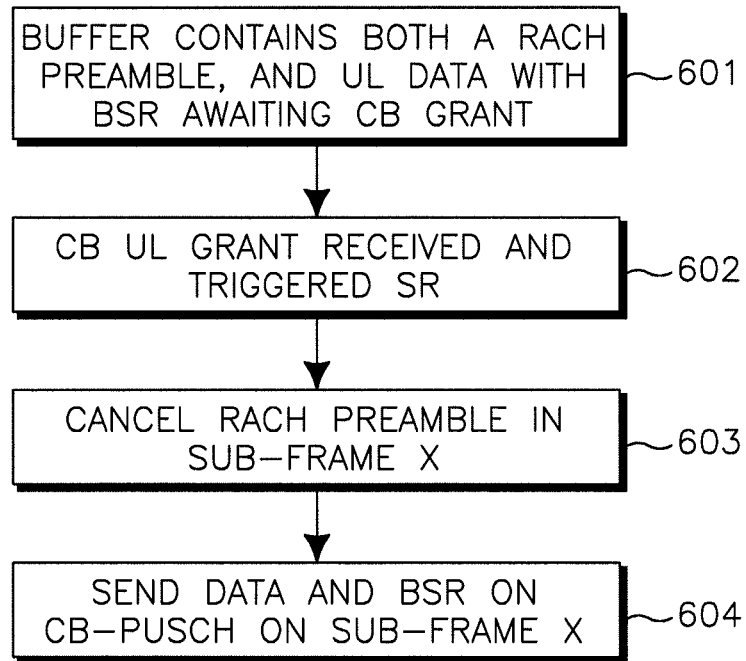
FIGS. 6A-6C show method flow charts for simultaneous transmission on a contention-based uplink and a random access channel.
Figure 6B:
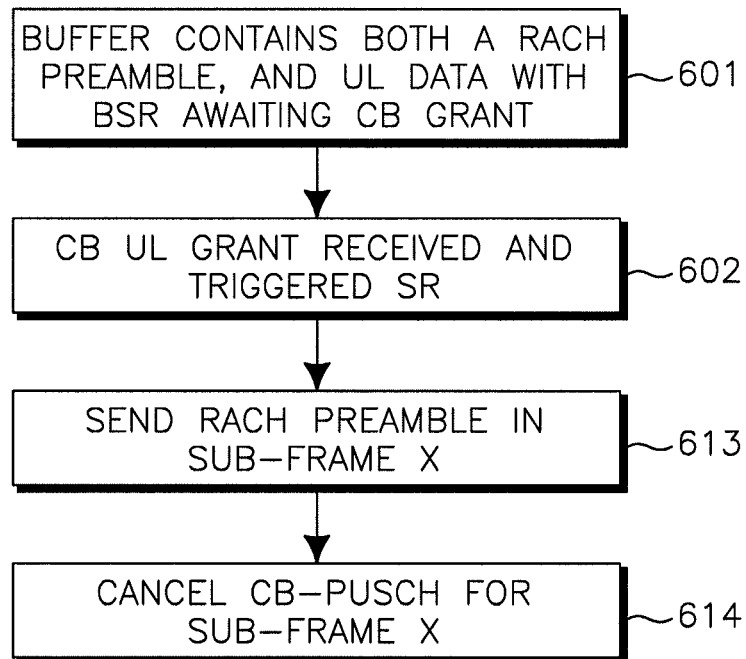
Figure 6C:
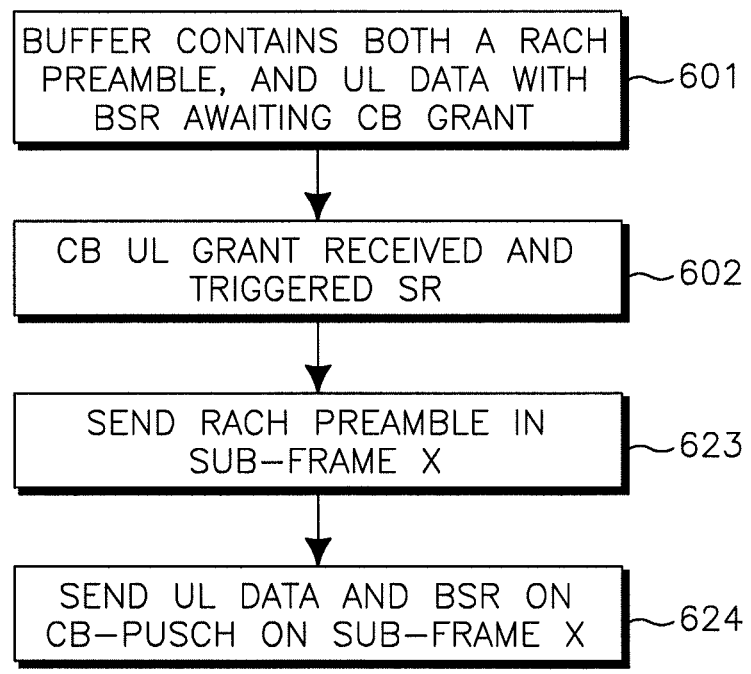

When the WTRU 102a has a triggered SR or at least one pending SR, it may transmit a RACH preamble due to the absence of a PUCCH in any TTI or if maximum number of retransmissions of a dedicated SR is reached, whereupon the WTRU 102a cancels all pending SRs. According to another embodiment now described, the WTRU 102a handles simultaneous pending transmissions of RACH preambles (triggered as described above) and CB-PUSCH. FIG. 6A shows a first example, where a buffer of WTRU 102a has a RACH preamble and uplink data and BSR ready for transmission at condition 601, the latter awaiting a CB grant. If the WTRU 102a with a pending SR receives a valid CB uplink grant successfully at 602, the WTRU 102a may transmit CB-PUSCH data with a BSR at 604 in sub-frame X and cancel the RACH preamble transmission at 603 (e.g., a RACH message 1) in the same sub-frame X. As a result, once the CB-PUSCH transmission from this WTRU 102a is received successfully at the eNodeB 140a, the eNodeB 140a may schedule the subsequent uplink transmission more efficiently having the knowledge of the BSR. This CB-PUSCH transmission is faster than a first uplink transmission on a RACH (e.g., a RACH message 3). In an alternative example shown in FIG. 6B, in response to the CB grant 602, the WTRU 102a may only transmit a RACH preamble at 613 in a sub-frame X, but will not transmit CB-PUSCH at 614 in the same sub-frame X. FIG. 6C provides an illustration of another alternative for this embodiment, in which the WTRU 102a transmits a RACH preamble at 623 while also transmitting a CB-PUSCH with a BSR at 624 in the same sub-frame X, in response to receiving a valid contention-based uplink grant successfully at 602.

In yet another alternative, when the WTRU 102a has a triggered or a pending SR, and/or has initiated a CB-PUSCH, it may transmit a RACH on a condition that a predefined maximum number of retransmissions of a dedicated SR were already attempted on the PUCCH, or a BSR on the CB-PUSCH has been already sent unsuccessfully.

Figure 7:
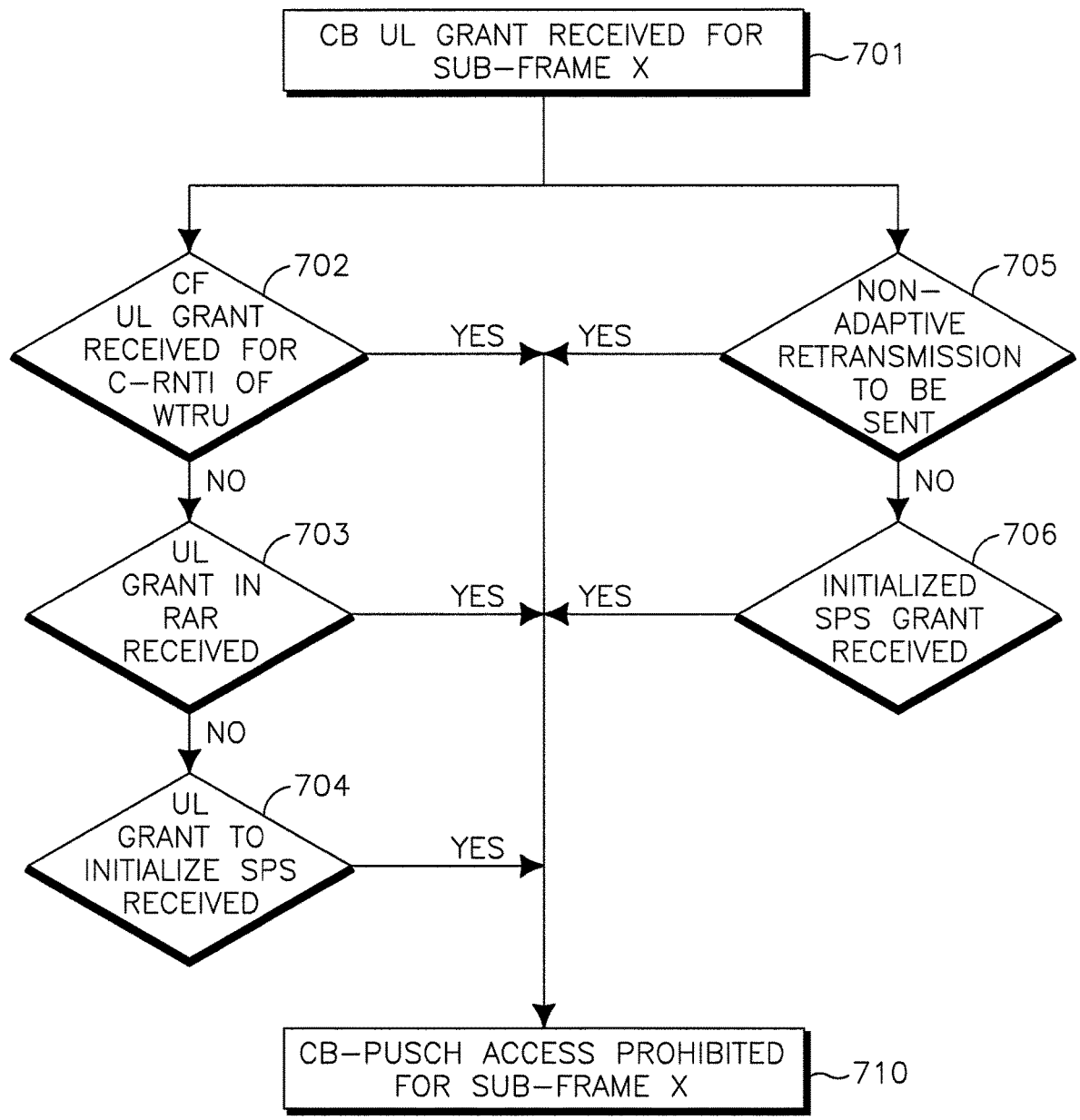
FIG. 7 shows a method flow chart for conditional restriction of access to the contention-based uplink channel despite receiving uplink grants for a sub-frame.

The WTRU 102a may receive simultaneous types of uplink grants in a sub-frame and may handle such grants as follows. As shown in FIG. 7, CB-PUSCH access by the WTRU 102a is prohibited (710) in a sub-frame X, even if it receives a contention-based uplink grant (701), if any of the following conditions occur. At condition 702, WTRU 102a successfully receives an uplink grant on the PDCCH (e.g., DCI format 0) for the C-RNTI or temporary C-RNTI of the WTRU 102a in the same sub-frame. At condition 703, the WTRU 102a successfully receives an uplink grant in the Random Access Response (RAR) in the same sub-frame X. At condition 704, the WTRU 102a successfully receives an uplink grant on the PDCCH to initialize or re-initialize SPS (e.g., for DCI format 0) for the WTRU's SPS C-RNTI in the same sub-frame X. Another condition 705 for the WTRU 102a has a non-adaptive retransmission for transmission in the same sub-frame X (e.g., in response to reception of NACK without uplink grant). At condition 706, the WTRU 102a has a configured SPS uplink grant previously initialized by a PDCCH in a sub-frame previous to sub-frame X.

Next described are details on transmission format and signaling aspects for the CB-PUSCH. In consideration of the lack of accurate channel state information, using a robust transmission scheme for CB-PUSCH is proposed. Adopting a robust transmission scheme improves CB-PUSCH capability by increasing the success rate of the transmissions. To achieve this, the CB-PUSCH may be limited as to the modulation schemes employed, for example, limited to binary phase shift keying (BPSK)/quadrature phase shift keying (QPSK). Additional ways in which robustness can be improved is configuring the CB-PUSCH transmissions such that the code rate may be limited to a low code rate (such as ⅓, ⅙), and/or configuring the antenna transmission scheme that it may be limited to transmit diversity, if the WTRU has more than one antenna.

Regarding signaling aspects for the CB-PUSCH, the information regarding the transmission parameters for CB-PUSCH may be received by the WTRU 102a semi-statically and/or dynamically. With respect to semi-static signaling, if some fixed CB-PUSCH parameters (such as modulation and coding schemes (MCS)) are used, then those parameters may be received by the WTRU 102a via broadcast or through RRC signaling. Those parameters may also be standardized, so no signaling is needed. However, PDCCH signaling to the WTRU 102a is necessary as contention-based RBs are different from sub-frame to sub-frame.

With respect to dynamic signaling, the details of the CB-PUSCH transmission format may be conveyed to WTRUs through PDCCH signaling. Therefore, one of the following downlink control information (DCI) formats may be used.

In a first DCI format for the CB-PUSCH, the WTRU 102a may receive a DCI Format 0 as defined by LTE Rel8, which is modified to make use of unused (undefined) fields. In a first modification, the cyclic redundancy check (CRC) coding may be scrambled by a CB-RNTI. Since many fields defined in Format 0 are not necessary for CB-PUSCH operation, they may be ignored or used for other purposes in CB-PUSCH. Table 2 summarizes an example of mandatory fields and unused fields for CB-PUSCH operation.

TABLE 2

CB-PUSCH Format 0 fields

| | Field size |
|---|---|
| Mandatory Fields | |
| Flag for format0/format1A differentiation | 1 bit |
| Modulation and coding scheme and redundancy version. If MCS is standardized or fixed, then this field will become unused. If only a limited set of MCS will be used for CB-PUSCH, then a truncated MCS field will be used, and the rest of the MCS bits will become unused bits. | 5 bits |
| Resource block assignment and hopping resource allocation. | Defined according to type of general allocation (e.g., fixed or bandwidth dependent) |
| Unused fields | |
| Hopping flag | 1 bit |
| New data indicator | 1 bit |
| Transmit power control (TPC) command for scheduled PUSCH | 2 bits |
| Cyclic shift for demodulation reference signal (DM RS) | 3 bits |
| UL index (this field only applies to time division duplex (TDD) operation with uplink - downlink configuration 0 and is not present in frequency division duplex (FDD)) | 2 bits |
| Downlink Assignment Index (DAI) (this field only applies for TDD operation with uplink-downlink configurations 1-6 and is not present in FDD). | 2 bits |
| Channel quality indicator (CQI) request | 1 bit |
| Modulation and coding scheme (MCS) and redundancy version, if MCS is standardized or truncated | 1~5 bits |

An alternative DCI format may be defined as a DCI Format 0A, which has a reduced set of fields compared with DCI Format 0 described above. The DCI Format 0A may be a reduced version of DCI Format 0 by elimination of the fields left as unused from the DCI Format 0, and thus a reduced PDCCH signaling overhead results. Table 3 summarizes an example of the field set for the DCI Format 0A.

TABLE 3

CB-PUSCH Format 0A Fields

| Field | Size |
|---|---|
| MCS and redundancy version. If MCS is standardized or fixed, then this field is not used. If only a limited set of MCS will be used for CB-PUSCH, then a truncated MCS field will be used (less than 5 bits), and the rest of MCS bits become unused. | 5 bits |
| Resource block assignment and hopping resource allocation | Defined according to type of general allocation (e.g., fixed or bandwidth dependent) |

With respect to RB allocation, the DCI format 0 defined in LTE Rel-8 allocates contiguously allocated uplink RBs. Since the RBs not allocated to contention-free PUSCHs (i.e., RBs allocated for CB-PUSCH) are by nature non-contiguous, a single modified DCI Format 0 cannot allocate all CB resources. An embodiment employing one of the following approaches may be used for handling signaling of RB allocation for CB-PUSCH. In a first approach, since the downlink common search space for PDCCH is limited, the number of PDCCHs allocating CB resources should also be limited. Those aforementioned unused bits (such as TPC, new data indicator (NDI), etc.) may be used together with the RB assignment, and hopping resource allocation fields may be changed to allow one reused DCI Format 0 that allocates multiple or all non-contiguous RBs. One way to signal non-contiguous RBs is to use a bitmap based RB allocation. In another approach, common search space is increased. Multiple uplink grants with different or the same CB-RNTI(s) may be used in the same sub-frame to signal CB RBs, with each uplink grant allocating one or several contiguous RBs grouped according to the non-contiguous spacing of the CB uplink grant.

In order to deal with power control for the CB-PUSCH, it is noteworthy that due to inactivity of the WTRU 102a in a dormant sub-state, there is no accurate reference for power control. Nonetheless, the power control for CB-PUSCH is important, as unlike a RACH procedure, the process involved in CB-PUSCH does not rely on orthogonal preambles. As such, there may be interference from multiple WTRUs competing for the same CB-PUSCH resources. In order to avoid any delay in the system while performing power control and defeating the main purpose of CB-PUSCH, the following approaches may be implemented.

In a first example approach for power control, an open-loop power setting procedure (without the use of a transmit power control (TPC) command) for the CB-PUSCH may be implemented. An example of such an open loop power setting is presented below in Equation 1:

$$P_{CB\_PUSCH}(i) = \min\{P_{CMAX}, 10\log_{10}(M_{PUSCH}(i)) + P_{O\_PUSCH}(j) + \alpha(j) \cdot PL + \Delta_{TF}(i)\} \quad \text{Equation (1)}$$

where:

$P_{max}$ is the configured WTRU transmitted power, defined as MIN $\{P_{EMAX}, P_{UMAX}\}$, where $P_{EMAX}$ is the maximum allowed power configured by higher layers and $P_{UMAX}$ is the maximum WTRU power for the specified WTRU power class.

$M_{PUSCH}{}^{(i)}$ is the bandwidth of the CB-PUSCH resource assignment expressed in a number of resource blocks valid for subframe i.

$P_{O\_PUSCH}{}^{(j)}$ is a parameter composed of the sum of a cell specific nominal component $P_{O\_NOMINAL\_PUSCH}{}^{(j)}$ provided from higher layers for j=0 and 1 and a WTRU specific component $P_{O\_UE\_PUSCH}^{(j)}$. A new type (i.e., for j=3) of $P_{O\_PUSCH}^{(j)}$ may be defined for the CB-PUSCH. $\Delta_{TF}^{(i)}$ compensates the transmit power according to the MCS used for the CB-PUSCH.

PL is the downlink pathloss estimate calculated in the WTRU based on reference signal (RS) power provided by higher layers and received RS power.

$\alpha(j)$ is a cell specific parameter provided by higher layers.

Alternatively, the CB-PUSCH transmission may apply the last PUSCH (or PUCCH) power level to the transmit power determined by the above open-loop power control. However, the final transmit power setting needs to be adjusted according to the modulation/coding setting used for the CB-PUSCH.

Alternatively, a limited two state power ramping for CB-PUSCH may be used. If $p_0$ is assumed as the power level for the first attempt, in case of failure to receive an UL-SCH grant from an earlier CB-PUSCH attempt, the WTRU 102a may proceed with $p_0+\Delta p$ for the next attempts if any, where $\Delta p$ is a predefined power step.

Next described is an overall procedure for CB-PUSCH operation. The CB-PUSCH is typically used for small data packets, and thus has a limited amount of data to transmit. For example the CB-PUSCH might contain only WTRU identity, BSR and a small payload. The eNodeB may indicate, either by semi-static signaling or by a grant on the PDCCH channel, that certain RBs are available for contention-based transmissions. The available RBs provide resources for one or more WTRUs.

The MCS and transport format used for the CB-PUSCH may be standardized, semi-statically signaled by the network, or as indicated in the PDCCH grant. The MCS and format apply to a single WTRU (e.g., WTRU 102a) using a designated number $N^{CB}_{RB}$ of RBs, rather than to the total number of RBs identified in the grant. It is also possible that different MCSs and formats may be specified for SRs and data packets.

The WTRU 102a may use $N^{CB}_{RB}$ RBs for a CB uplink transmission, where the value $N^{CB}_{RB}$ may be standardized or semi-statically signaled by the network. The value for $N^{CB}_{RB}$, along with the MCS and data format, effectively determine the maximum size data packet that may be sent using CB resources. For the eNodeB 140a to decode the data, all CB-PUSCHs may have transport block size and MCS that are known to the eNodeB 140a. If the WTRU 102a has less data than the CB transport block size, it needs to fill the remaining space with power headroom (PHR) information and padding bits.

When the WTRU 102a has a triggered or pending SR (i.e., triggered by data), for each subframe until the SR is canceled, the WTRU 102a may attempt to send either a contention-free SR or CB PUSCH transmission. The priority between contention-free SRs and CB transmissions may either be standardized or set by the network using semi-static signaling as a function of the network load. The following priority rules may be applied. A first rule may be that the CB resources always get priority. Alternatively, the contention-free resources always get priority, or they may get priority after a standardized (or semi-statically signaled) number of CB attempts fail. A third possible rule may be that the CB resources are not used if contention-free resources will be available within a certain number of subframes (the number may be set to one or more). The number of subframes may be standardized or set by the network using semi-static signaling as a function of the network load. Another possible rule may be that the CB resources may get priority over contention-free resources if the amount of buffered data is below a threshold. The threshold may be pre-defined or signaled by higher layers. Alternatively, the threshold may correspond to the amount of information bits that may be transmitted in a single CB transmission, or a factor thereof. Alternatively, the threshold(s) may be a function of the amount of resources available for the CB PUSCH (expressed for instance in terms of RBs) or the MCS to use for CB transmissions. In addition to any of the above, the CB transmission may be abandoned after a standardized or semi-statically signaled number of attempts are unsuccessful. When the WTRU 102a needs to send the CB PUSCH, it may select $N^{CB}_{RB}$ RBs from those available according to a standardized random function or hash function to minimize collisions. The random function should be chosen so that the sequence of selections made by different WTRUs will be uncorrelated. For example, a hash function may be selected with inputs such as a WTRU ID (e.g., the C-RNTI) and Cell ID.

The network may acknowledge receipt of the CB-PUSCH as follows. A scheduling grant from the eNodeB 140a implicitly acknowledges receipt of a CB-PUSCH because it implies that the eNodeB 140a successfully received the BSR and the data payload sent with the BSR, in a similar manner as for a contention-free SR. With respect to ACK/NACK signaling, an acknowledgement (ACK) signal may be used to explicitly acknowledge receipt of the CB-PUSCH, in which case the WTRU 102a will not need to transmit additional SRs or PUSCHs while it is waiting for the scheduling grant. It is not possible for the network (eNodeB 140a) to send a negative acknowledgement (NACK) signal since it will have no knowledge that the WTRU attempted to send data. Therefore, if the eNodeB is configured for ACK signaling to acknowledge the CB-PUSCH, the WTRU 102a has to be configured to distinguish between an ACK and the case of no transmission.

If the WTRU 102a has the opportunity to send a contention-free SR between the time the CB-PUSCH is transmitted and the reception of an ACK or scheduling grant, the WTRU 102a may send this contention-free SR, but the eNodeB 140a will ignore it if the CB-PUSCH was already received successfully. To handle a situation where the WTRU 102a does not correctly decode an ACK sent by the eNodeB 140a, the WTRU 102a could send the contention-free SR and appropriate error handling is specified. This condition may be avoided by setting the number of subframes to wait for contention-free resources to be greater than the delay between sending a data packet and receiving an ACK for that data packet. Alternatively, the WTRU 102a simply may not send a contention-free SR between the time a CB-PUSCH was transmitted and the time an ACK is expected.

The WTRU 102a continues to send either the contention-free SR or the CB-PUSCH according to the rules above at a specified interval until a contention-free uplink scheduling grant is received or an ACK is received for the CB-PUSCH and it has no more data to transmit. The interval for CB transmissions should be randomly selected within a standardized range, and a different interval should be selected between each SR transmission. Alternatively, the interval for CB transmissions may be fixed, either by standardization or by semi-static signaling. If a CB-PUSCH is sent, the WTRU 102a makes an independent random selection of RBs to use, and increases the power as described above.

Next described is a sub-channelization method for the CB-PUSCH. As described above, the WTRU 102a uses $N^{CB}_{RB}$ RBs for a CB uplink transmission, where $N^{CB}_{RB}$ may be standardized or semi-statically signaled by the network.

A method for sub-channelization of the CB-PUSCH may be used by the WTRU 102a that creates sub-channels from the total number of available RBs for the CB-PUSCH. While specific sizes are described, the scope of this embodiment is not limited to such sizes which could be suitably modified. FIG. 8 shows an example of a CB-PUSCH sub-channel structure, with the first two slots in the time domain shown, Slot 0 and Slot1. Sub-channels 801, 802 belong to Slot 0, and sub-channels 803, 804 are in Slot 1, and the sub-channels are non-overlapping. Each sub-channel is defined by n RBs; in this example, n=1 for all sub-channels 801-804. Each RB is defined as having multiple resource elements (REs) (e.g., 12 REs per RB). Each sub-channel consists of in subcarriers across one slot (e.g., m=12). Each slot is shown having 7 symbols, which may be OFDM-based. One symbol in the slot may be used to carry the reference signal (RS). For example, as shown in FIG. 8, the middle symbol of the slot is used to carry the RS. The WTRU 102a may use any one or more of the sub-channels in each slot, or may be configured to use a subset of the sub-channels. For example, the sub-channels 801 and 802 in FIG. 8 could be used by the WTRU 102a for the CB-PUSCH transmission.

The sub-channel structure may either be configured by higher layer signaling, be defined by standard specifications, or signaled by the PDCCH. If the sizes of all sub-channels are fixed, for example n RBs, then it is enough to signal the parameter n. If the sizes of the sub-channels are different, for example (n, m, k) for three sub-channels, then at least these three parameters n, m, k should be signaled.

The RS may be based on a Zadoff-Chu (ZC) sequence and the WTRU 102a may select a cyclic shift of a given sequence randomly and use it as the RS. The set of cyclic shifts that may be selected by the WTRU 102a or used in a specific sub-channel may be restricted by configuration. It is also possible to allocate more resources for the RS transmission as shown in FIG. 9, where the second and sixth symbols are used to carry the RS in each slot for the sub-channels 901-904. Here again, each sub-channel consists of a single RB.

Figure 10:
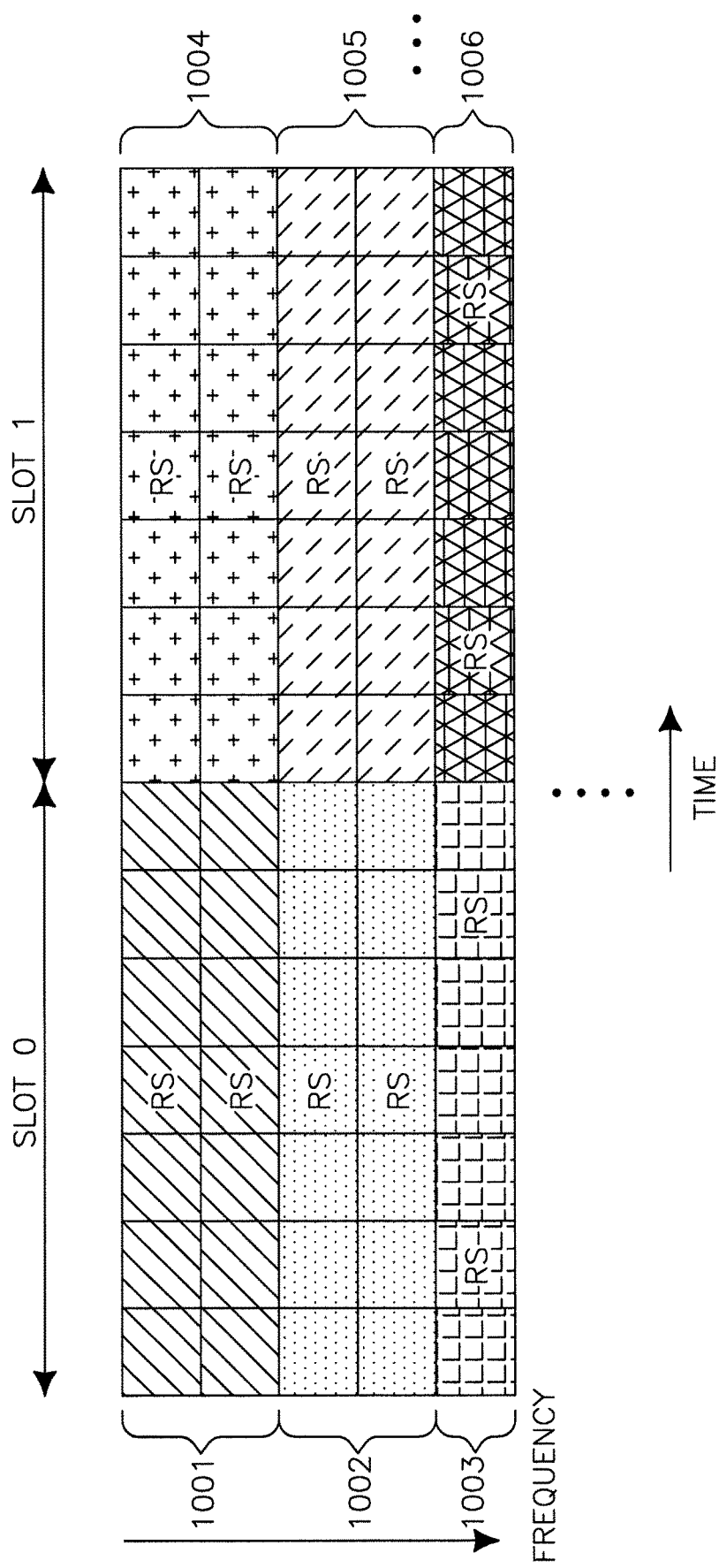

As shown in FIG. 10, the sizes of sub-channels may be different. Sub-channels 1001, 1002, 1004, and 1005 each consist of 2 RBs, while sub-channels 1003 and 1006 each carry only a single RB. FIG. 10 also shows the possible variation as to the number of RSs and locations across the sub-channels, as sub-channels 1001, 1002, 1004 and 1005 each have on RS located in the middle OFDM symbol, but sub-channels 1003 and 1006 each carry two RSs. Such variations enable the WTRUs to selectively access a particular type of sub-channel depending on the amount and type of data that needs to be transmitted in the CB-PUSCH.

In addition to or in place of dynamic grants for CB transmissions, semi-persistently scheduled (SPS) grants for CB transmissions may be defined. Such SPS grants for CB transmissions work in a manner similar to SPS grants for contention-free transmissions, except for the following differences. The periodicity of SPS grants for CB transmissions and the number of RBs available for CB transmissions may be signaled to the WTRU 102a over system information. The transmission time offset (in units of sub-frames) may be semi-statically configured and also be signaled over system information. In this case, there would be no need to "initiate" the recurring SPS grant with an initial SPS grant signaled over PDCCH as in the normal SPS grant for contention-free transmissions.

In case the transmission time offset would be based on an initial SPS grant signaled over system information (with a special C-RNTI value), a maximum validity time (or maximum number of recurrences) should be defined for the CB SPS grant. The WTRU 102a may determine that the CB SPS grant is unavailable upon expiration of a timer (or counter) started upon reception of the CB SPS grant. This approach provides some additional protection to the network against unwanted access attempts from the WTRU 102a, in case it wants to reclaim the resources that had been used for CB transmissions.

The use of SPS grants for CB transmissions benefits the network by allowing the use of CB transmissions without increasing the PDCCH load significantly. Using SPS grants for CB uplink allows the WTRU 102a to better predict in time the availability of access to the CB uplink channel. For instance, if the WTRU 102a determines that an SPS CB grant will be available imminently, the WTRU 102a may then refrain from monitoring the PDCCH in certain sub-frames for conserving battery resources.

An uplink signal may contain Demodulation Reference Signals (DM-RS) that are intended for channel estimation and coherent demodulation. In time domain, the location of the DM-RS may be defined to be on a particular symbol of each slot (e.g., the fourth OFDM-based symbol). For CB uplink operation, the WTRU 102a may set the length of the DM-RS signal in the frequency domain to match the size of the allocated resources for CB uplink operation. For example, if n RBs are allocated for CB-PUSCH, then the DM-RS width should also be n RBs.

With respect to the CB uplink channel processing at the eNodeB 140a, the channel is estimated for each potential received DM-RS signal. Since there is no coordination among different users for using CB uplink resources, collisions among the WTRUs are possible. Therefore, the estimated channel may be used for resolution and separation of simultaneous CB uplink transmissions. If two WTRUs transmit on the same CB resources but with different DM-RS, the eNodeB 140a may operate similar to handling a virtual uplink MU-MIMO as in defined by the LTE specifications. The eNodeB 140a may detect and decode both of the two WTRU transmissions. A sequence similar to what is used for regular PUSCH operation may also be used for generation of the DM-RS. In order to reduce the detection complexity at eNodeB, a few sequences may be selected and assigned for the CB uplink operation. This information may be conveyed to the WTRU 102a along with other CB uplink information/parameters. That is, this information may be signaled via RRC signaling (e.g., when the WTRU 102a is configured or reconfigured via RRC connection), an uplink grant for the CB-PUSCH, or broadcast via SIB.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A wireless transmit/receive unit (WTRU) comprising:
a receiver, a transmitter, and a processor;
the receiver and the processor configured to receive a first downlink control information (DCI) having a cyclic redundancy check (CRC) scrambled with a first radio network temporary identifier (RNTI), wherein the first RNTI is associated with a dynamic resource allocation;
the transmitter and the processor configured to transmit, based on the first DCI, a first uplink physical uplink shared channel (PUSCH) transmission;
the receiver and the processor further configured to receive a second DCI having a CRC scrambled with a second RNTI, wherein the second RNTI is associated with a semi-persistent resource allocation;
the transmitter and the processor further configured to transmit, based on the second DCI, a second uplink PUSCH transmission;
the receiver and the processor further configured to receive a higher layer signal indicating uplink resources; and
the transmitter and the processor further configured to transmit, based on the higher layer signal and not based on a DCI including a grant, a third uplink PUSCH transmission.

2. The WTRU of claim 1, wherein the third transmission has a duration less than or equal to a slot.

3. The WTRU of claim 1, wherein the transmitter and the processor are further configured to periodically transmit based on the second DCI.

4. The WTRU of claim 1, wherein the transmitter and the processor are further configured to periodically transmit based on the higher layer signal.

5. The WTRU of claim 1, wherein the receiver and the processor are further configured to receive radio resource control (RRC) signaling indicating resources for a contention based (CB) shared channel;
the processor is further configured to select the CB shared channel autonomously from the resources indicated in the RRC signaling; and
the transmitter and the processor are further configured to, on a condition that an uplink grant is received in a random access response for a subframe in which a transmission using the CB shared channel would occur, not transmit using the CB shared channel in the subframe and to transmit using a contention-free shared channel using the uplink grant received in the random access response.

6. The WTRU as in claim 5, wherein the processor is further configured to monitor statistics of uplink contention-based resource usage and uplink contention-free resource usage; and to determine, based on the monitoring, whether to use the CB shared channel or a probability of access to the CB shared channel.

7. The WTRU as in claim 5, wherein the WTRU is configured to, on a condition that the WTRU has a pending scheduling request and receives a valid CB uplink grant: transmit on a CB uplink channel, and cancel a random access channel (RACH) preamble transmission in a same sub-frame.

8. The WTRU as in claim 5, wherein the WTRU is configured to, on a condition that the WTRU has a pending scheduling request and receives a valid uplink grant: transmit a RACH preamble, and prohibit transmission on the CB shared channel in a same sub-frame.

9. The WTRU as in claim 5, wherein the WTRU is configured to, on a condition that the WTRU receives more than one uplink grant for a subframe: not transmit on the CB shared channel on condition that at least one contention-free grant is received for a cell radio network temporary identifier (C-RNTI) of the WTRU.

10. The WTRU as in claim 5, wherein the WTRU is configured to, on a condition that the WTRU receives more than one uplink grant for a sub-frame: not transmit on the CB shared channel on condition that at least one uplink grant is received to initialize semi-persistent scheduling (SPS) on a contention-free uplink channel for an SPS cell radio network temporary identifier (C-RNTI) of the WTRU.

11. A method for wireless communications implemented by a wireless transmit/receive unit (WTRU), the method comprising:
transmitting an uplink transmission on a physical uplink shared channel (PUSCH); wherein
on a condition that the WTRU receives a first downlink control information (DCI) having a cyclic redundancy check (CRC) scrambled with a first radio network temporary identifier (RNTI) associated with a dynamic resource allocation:
the uplink transmission is based on the first DCI;
on a condition that the WTRU receives a second DCI having a CRC scrambled with a second RNTI associated with a semi-persistent resource allocation:
the uplink transmission is based on the second DCI; and
on a condition that the WTRU receives a higher layer signal indicating uplink resources:
the uplink transmission is based on the higher layer signal and not based on a DCI including a grant;
wherein the WTRU is configured to transmit uplink transmissions based on the first DCI, transmissions based on the second DCI, and transmissions based on the higher layer signal.

12. The method of claim 11, wherein on a condition that the uplink transmission is based on the higher layer signal, the transmission has a duration less than or equal to a slot.

13. The method of claim 11, further comprising periodically transmitting based on the second DCI.

14. The method of claim 11, further comprising periodically transmitting based on the higher layer signal.

15. The method of claim 11, further comprising:
receiving radio resource control (RRC) signaling indicating resources for a contention based (CB) shared channel;
selecting the CB shared channel autonomously from the resources indicated in the RRC signaling; and
on a condition that an uplink grant is received in a random access response for a subframe in which a transmission using the CB shared channel would occur, not transmitting using the CB shared channel in the subframe and transmitting using a contention-free shared channel using the uplink grant received in the random access response.

16. The method as in claim 15, further comprising:
monitoring statistics of uplink contention-based resource usage and uplink contention-free resource usage; and
determining, based on the monitoring, whether to use the CB shared channel or a probability of access to the CB shared channel.

17. The method as in claim 15, further comprising:
on a condition that the WTRU has a pending scheduling request and receives a valid CB uplink grant: transmitting on a CB uplink channel, and cancelling a random access channel (RACH) preamble transmission in a same sub-frame.

18. The method as in claim 15, further comprising:
on a condition that the WTRU has a pending scheduling request and receives a valid uplink grant: transmitting a RACH preamble, and prohibiting transmission on the CB shared channel in a same sub-frame.

19. The method as in claim 15, further comprising:
on a condition that the WTRU receives more than one uplink grant for a subframe: not transmitting on the CB shared channel on condition that at least one contention-free grant is received for a cell radio network temporary identifier (C-RNTI) of the WTRU.

20. The method as in claim 15, further comprising:
on a condition that the WTRU receives more than one uplink grant for a sub-frame: not transmitting on the CB shared channel on condition that at least one uplink grant is received to initialize semi-persistent scheduling (SPS) on a contention-free uplink channel for an SPS cell radio network temporary identifier (C-RNTI) of the WTRU.

* * * * *